No. 773,684. PATENTED NOV. 1, 1904.
F. N. SPELLER.
RECORDING PYROMETER.
APPLICATION FILED JAN. 30, 1904.
NO MODEL.

WITNESSES:

INVENTOR:
Frank N Speller
By Kay Totten & Winter
ATTORNEYS.

No. 773,684.

Patented November 1, 1904.

UNITED STATES PATENT OFFICE.

FRANK N. SPELLER, OF McKEESPORT, PENNSYLVANIA.

RECORDING-PYROMETER.

SPECIFICATION forming part of Letters Patent No. 773,684, dated November 1, 1904.

Application filed January 30, 1904. Serial No. 191,360. (No model.)

*To all whom it may concern:*

Be it known that I, FRANK N. SPELLER, a resident of McKeesport, in the county of Allegheny and State of Pennsylvania, have invented a new and useful Improvement in Recording-Pyrometers; and I do hereby declare the following to be a full, clear, and exact description thereof.

My invention relates to heat-measuring devices; and its object is to provide a device of this character which is simple in construction and more reliable and efficient than prior devices of this kind.

Figure 1:
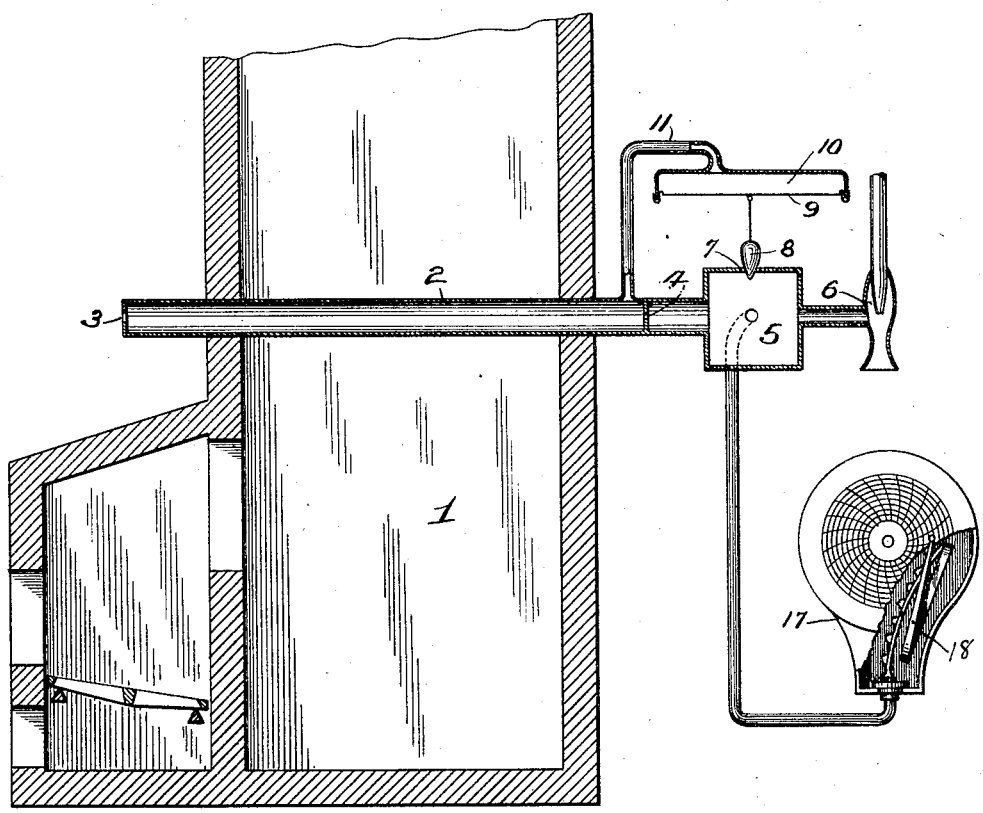
Figure 2:
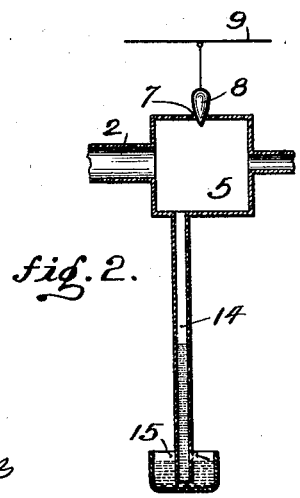

In the accompanying drawings, Figure 1 shows a sectional diagram of my apparatus, and Fig. 2 shows a modified form of measuring device.

1 indicates a chamber whose heat is to be measured, such as a flue, furnace, or the like. Projecting into or through this chamber is a tube or other hollow body 2, which will be provided with a small orifice 3, opening to the air, and a smaller orifice 4, connected by a tube to a suction-chamber 5, in which a continuous suction will be maintained by any suitable means, such as the injector 6. By means of this injector and a suction-regulating device a constant suction will be maintained in the tube 2 and will draw a small uniform quantity of air through the orifice 3.

The suction-chamber 5 is provided with the orifice 7, opening to the air. The size of this orifice is varied by means of a controlling-valve 8, connected to a diaphragm 9, forming one wall of a suction-regulating chamber 10, said chamber being connected by pipe 11 to tube 2.

The indicating or measuring device will be connected to the suction-chamber 5. This indicator may be a manometer 14, which comprises a glass or similar tube having its lower end open and projecting into a vessel 15, containing water or other liquid. This liquid will be forced by atmospheric pressure up into the tube 14, and the height of the column of water in said tube will depend upon the suction in the chamber 5, and hence will indicate the temperature in the tube 2, as will be hereinafter described. In the place of this manometer I may connect to the suction-chamber 4 an ordinary Bristol vacuum-recording device 17 of well-known type, this having a flexible bent or serpentine tube, which will vary its position by variation in suction thereon and will move an indicating-arm 18 over a dial in the well-known manner.

The operation of my apparatus is as follows: The suction device 6 will maintain a continuous suction in the chamber 5 and tube 2, drawing in a small quantity of air through the orifice 3 and also some air through the orifice 7. This suction will produce pressure in the chamber 5 less than atmospheric pressure and will cause an indication either in the manometer 14 or Bristol vacuum-recorder 17. As long as the temperature in chamber 1 remains constant the indications in the manometer or vacuum-recorder will remain the same. Should, however, the temperature in the chamber 1 increase perceptibly, it will cause a corresponding increase in the temperature of the air of the tube 2, thus increasing the volume and pressure of air therein. This increased pressure will be communicated through the pipe 11 to the suction-regulating chamber 10, thus forcing down the diaphragm 9 and lowering the valve 8, so as to partially close the orifice 7. As a consequence the suction device 6 will produce a more intense suction in chamber 5 by reason of the shutting off of a portion of the air-supply sufficient to increase the suction in the chamber 2 to the point at which it was originally set. This increased suction in chamber 5 will cause a corresponding rise of the liquid column in the manometer or a corresponding indication in the vacuum-recorder. As soon as the heat in the chamber 1 decreases there will result a corresponding decrease of pressure in the tube 2, which decrease will at once be communicated to the suction-regulating chamber 10, thus causing the diaphragm 9 to move upwardly and raise the valve 8, so as to permit a larger quantity of air to flow through the orifice 7. As a result the suction in the chamber 5 will be decreased, thus causing a corresponding indication in the manometer or vacuum-recorder. As this action is practically instantaneous, a uniform suction will be maintained in the tube 2.

It will thus be seen that by means of my device the temperature of the chamber 1 is not measured directly, but is measured indirectly by the pressure or suction in the chamber 5, which is necessary to keep a constant suction in tube 2. The constancy of this suction can be seen by attaching a differential gage of any known type to the chamber 10. The suction in chamber 5 will vary directly as the temperature in the tube 2, being due to the fact that variations in the temperature in said tube will produce corresponding variations in the volume of air therein, thus operating diaphragm 9 and valve 8 and producing corresponding variations in suction in the chamber 5, which variations are proportional to variations of temperature in the chamber 1 and tube 2.

The readings of the manometer or vacuum-recorder give differences of temperature between the chamber 1 and the outside air which enters orifice 3 at normal temperature. If temperature-readings independent of the temperature of the outside air are desired and it is inconvenient to apply a correction obtained by taking the temperature of the outside air by an ordinary thermometer, the air before entering the tube 2 may be preheated by passing the same through a coil of pipe surrounded by condensing steam. The zero or basis of temperature-readings will then be 212° Fahrenheit. For ordinary purposes this refinement would be superfluous.

The tube 2 may be varied in form and dimensions to meet various conditions and in all cases will be subjected to the heat to be measured.

The apparatus as a whole is very simple and contains no liquids or other elements which may dissipate or leak and when once properly adjusted will operate automatically and give a continuous indication or record of the temperature to be measured. This device can be used for measuring heat in any place or produced in any manner by merely adapting the tube or hollow body 2 to the conditions to be met.

What I claim is—

1. In a heat-measuring device, the combination of a chamber adapted to be subjected to the heat to be measured, a device for producing suction therein, means controlled by the pressure in the heated chamber for regulating the suction device, and a pressure-indicating device connected to the suction device.

2. In a heat-measuring device, the combination of a chamber adapted to be subjected to the heat to be measured, a device for producing suction therein, a regulating-valve for the suction device controlled by the pressure in the heated chamber, and a pressure-recorder connected with the suction device.

3. In a heat-measuring device, the combination of a chamber adapted to be subjected to the heat to be measured, a suction-chamber connected thereto and provided with an orifice leading to the air, a regulating-valve for said orifice controlled from the heated chamber, and a pressure-indicating device connected to the suction-chamber.

4. In a heat-measuring device, the combination of a chamber adapted to be subjected to the heat to be measured, a suction-chamber connected thereto and provided with an orifice leading to the air, a regulating-valve for said orifice controlled by the pressure in the heated chamber, and a vacuum-recorder connected to the suction-chamber.

5. In a heat-measuring device, the combination of a hollow body or tube adapted to be exposed to the heat to be measured and provided with entrance and exit orifices, a suction device connected to the exit-orifice of said tube, a regulating-valve for the suction device controlled by the temperature in the tube, and a measuring device controlled by the suction of said suction device.

6. In a heat-measuring device, the combination of a hollow body or tube adapted to be exposed to the heat to be measured and provided with an orifice leading to the air, a suction-chamber connected to the tube and also having an orifice leading to the air, a regulating-valve for said last-named orifice and controlled by the pressure in the tube, and a pressure-indicating device connected to said suction-chamber.

7. In a heat-measuring device, the combination of a hollow body or tube adapted to be exposed to the heat to be measured and provided with an orifice leading to the air, a suction-chamber connected to said tube and also having an orifice leading to the air, a regulating-valve for said last-named orifice, a suction-regulating chamber connected to the tube, a diaphragm forming one wall of said suction-regulating chamber, connections between said diaphragm and said regulating-valve, and a pressure-indicating device connected to said suction-chamber.

In testimony whereof I, the said FRANK N. SPELLER, have hereunto set my hand.

FRANK N. SPELLER.

Witnesses:
HARRISON PRINDLE,
G. M. GOODSPEED.